US 8,281,159 B1

(12) United States Patent
Cooley et al.

(10) Patent No.: US 8,281,159 B1
(45) Date of Patent: Oct. 2, 2012

(54) SYSTEMS AND METHODS FOR MANAGING POWER USAGE BASED ON POWER-MANAGEMENT INFORMATION FROM A POWER GRID

(75) Inventors: Shaun Cooley, El Segundo, CA (US); Keith Newstadt, Newton, MA (US)

(73) Assignee: Symantec Corporation, Mountain View, CA (US)

( * ) Notice: Subject to any disclaimer, the term of this patent is extended or adjusted under 35 U.S.C. 154(b) by 750 days.

(21) Appl. No.: 12/208,610

(22) Filed: Sep. 11, 2008

(51) Int. Cl.
*G06F 1/00* (2006.01)
(52) U.S. Cl. .................................. 713/300; 713/320
(58) Field of Classification Search ............... 713/300, 713/320, 323; 700/295; 340/286.01
See application file for complete search history.

(56) References Cited

U.S. PATENT DOCUMENTS

| | | | |
|---|---|---|---|
| 5,414,640 A * | 5/1995 | Seem .......................... | 700/291 |
| 6,289,399 B1 * | 9/2001 | Furuichi et al. ................ | 710/6 |
| 6,384,580 B1 | 5/2002 | Ochoa et al. | |
| 6,832,135 B2 * | 12/2004 | Ying .......................... | 700/295 |
| 7,360,106 B2 * | 4/2008 | Kato et al. .................... | 713/323 |
| 7,516,342 B2 * | 4/2009 | Jahagirdar et al. ............. | 713/320 |
| 2005/0097376 A1 * | 5/2005 | Weinberger et al. ........... | 713/320 |
| 2005/0154499 A1 | 7/2005 | Aldridge et al. | |
| 2006/0149978 A1 * | 7/2006 | Randall et al. ................. | 713/300 |
| 2006/0288241 A1 * | 12/2006 | Felter et al. .................... | 713/300 |
| 2007/0010916 A1 * | 1/2007 | Rodgers et al. ................ | 700/295 |
| 2008/0143489 A1 * | 6/2008 | Castaldo et al. .............. | 340/286.01 |
| 2008/0178029 A1 * | 7/2008 | McGrane et al. .............. | 713/324 |
| 2008/0189562 A1 * | 8/2008 | McBrearty et al. ............ | 713/300 |
| 2009/0307036 A1 * | 12/2009 | Archer et al. .................. | 705/8 |

OTHER PUBLICATIONS

"California ISO: System Status"; (accessed May 18, 2009); http://www.caiso.com/outlook/outlook.html.
"GridPoint: Reshaping the Load Duration Curve"; (accessed May 18, 2009); http://www.gridpoint.com/curve/overview/.
U.S. Appl. No. 12/204,893, filed Sep. 5, 2008, Cooley, Shaun.
U.S. Appl. No. 12/264,550, filed Nov. 4, 2008, Cooley, Shaun.
Final Office Action received in U.S. Appl. No. 12/264,550, dated Nov. 1, 2011.
Non-Final Office Action received in U.S. Appl. No. 12/264,550, dated Jul. 12, 2011.

* cited by examiner

*Primary Examiner* — Thomas Lee
*Assistant Examiner* — Xuxing Chen
(74) *Attorney, Agent, or Firm* — Advantedge Law Group (57) ABSTRACT

A computer-implemented method for managing power usage of a computing device based on power-management information from a power grid may comprise: 1) receiving power-management information from a power grid, 2) identifying power-usage requirements of the computing device, and then 3) determining, by analyzing the power-management information and the power-usage requirements of the computing device, whether to adjust power usage of the computing device. The method may also comprise adjusting the power usage of the computing device in accordance with the power-management information. Corresponding systems and computer-readable media are also disclosed.

20 Claims, 5 Drawing Sheets

SYSTEMS AND METHODS FOR MANAGING POWER USAGE BASED ON POWER-MANAGEMENT INFORMATION FROM A POWER GRID

BACKGROUND

Conventional power-management schemes typically manage the power usage of a computing device by determining whether, and to what extent, a user is currently using the computing device. While these schemes may provide the most optimal experience for users, such schemes fail to account for the impact of each device on a power grid. For example, when a high number of computing devices simultaneously draw power from a power grid, the collective draw of the computing devices may contribute to spikes on the power grid. Some researchers have even estimated that active computing devices (i.e., computing devices that are not in some form of sleep mode) within a single state may collectively draw as much as 322 Megawatts of power from a regional power grid during peak hours.

Unfortunately, if a high number of computing devices simultaneously draw power from a power grid, the power grid may experience unnecessary strain, resulting in both intentional (e.g., rolling blackouts) and unintentional power outages. As such, the instant disclosure identifies a need for managing the power usage of computing devices based on power-management information from a power grid.

SUMMARY

As will be described in greater detail below, the instant disclosure generally relates to systems and methods for managing power usage based on power-management information from a power grid. In one example, the system may determine whether to adjust the power usage of a computing device by: 1) receiving power-management information from a power grid, 2) identifying power-usage requirements of the computing device, and then 3) determining, by analyzing the power-management information and the power-usage requirements of the computing device, whether to adjust the power usage of the computing device.

The power-management information may contain a request from the power grid to reduce the power usage of the computing device to a preferred power-usage level. The power-management information may also identify (or contain information that may be used to calculate) an amount of power currently available on the power grid or an amount of power expected to be available on the power grid at a future time. The power-management information may be in computer-readable and/or human-readable form.

If the system determines that the computing system is currently using more power than the preferred-usage level, then the system may determine whether the amount of power used by the computing device may be reduced without negatively impacting the current or scheduled level of computing activity of the computing device. For example, if the system determines that the computing device is idle or merely engaged in light computing tasks (such as browsing the web), then the system may determine that the power usage of the computing device may be lowered without negatively impacting the current or scheduled level of computing activity of the computing device. Alternatively, if the system determines that the computing device is engaged in heaving computing tasks (such as video editing or gaming), then the system may determine that any reduction in the power usage of the computing device may negatively impacting the current or scheduled level of computing activity of the computing device.

If the system determines that the amount of power used by the computing device may be reduced without negatively impacting the current or scheduled level of computing activity of the computing device, then the system may reduce the power usage of the computing device by adjusting at least one power setting on the computing device (e.g., by causing the computing device to enter a power-saving, sleep, or hibernation mode) or by adjusting the power usage of at least one component of the computing device (e.g., by slowing the computing device's hard drives or fans, by dimming the brightness of one or more displays attached to the computing device, or by causing one or more CPUs or GPUs of the computing device to enter an under-voltage mode).

As will be explained in greater detail below, the systems and methods disclosed herein may allow computing devices to adjust power usage based on power-management information from a power grid. As a result, the number of power outages, both intentional (e.g., rolling blackouts) and unintentional, may decrease on a power grid.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The instant disclosure relates generally to systems and methods for managing power usage of computing devices based on power-management information from a power grid. The phrase "power grid," as used herein, generally refers to any power transmission system comprising at least one power source (e.g., power plants, electrical generators, solar panels, batteries, and battery arrays), at least one power consumer (e.g., computers and refrigerators), and at least one transmission line facilitating the flow of electricity from source to consumer.

Figure 1:
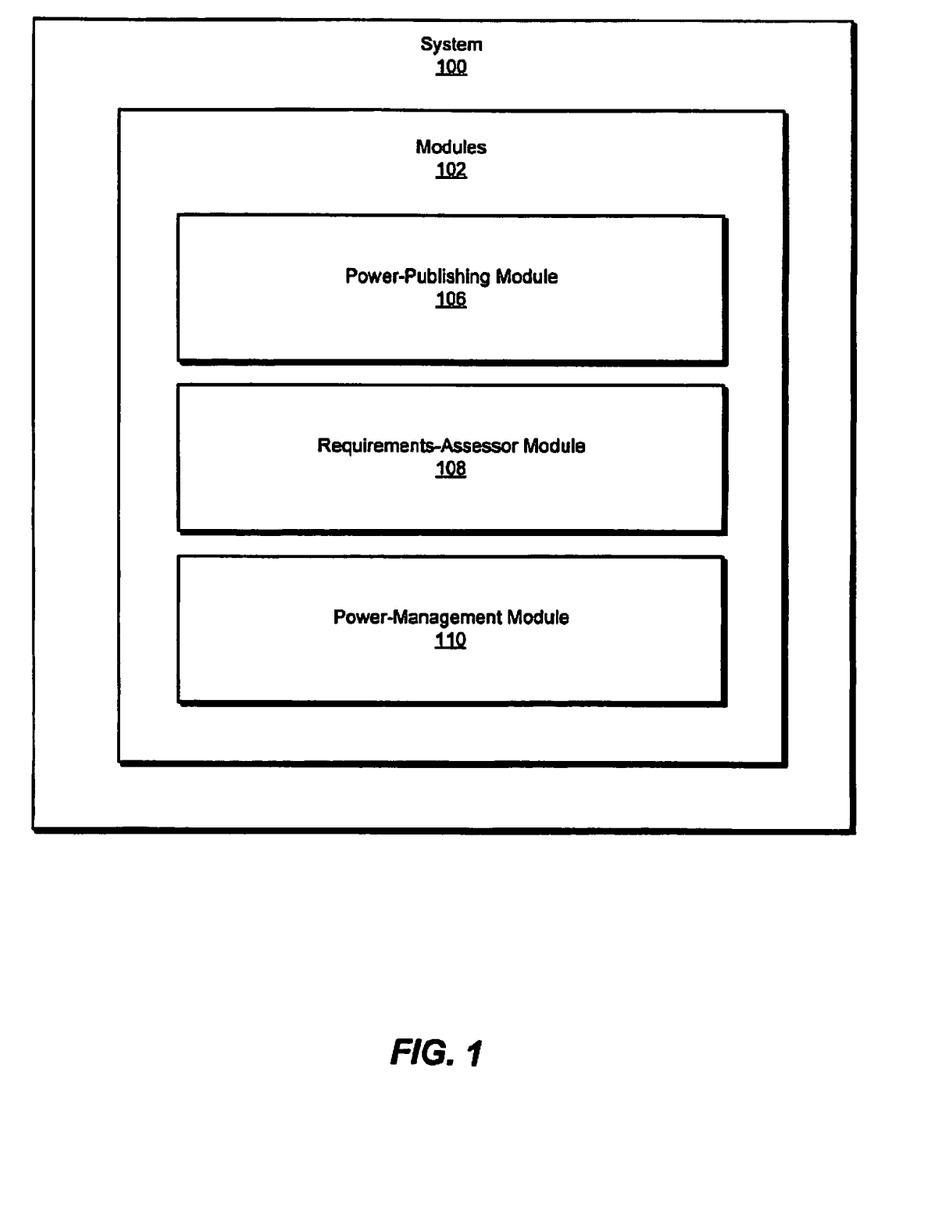
FIG. 1 is a block diagram of an exemplary system for managing power usage of a computing device based on power-management information from a power grid according to at least one embodiment.
Figure 2:
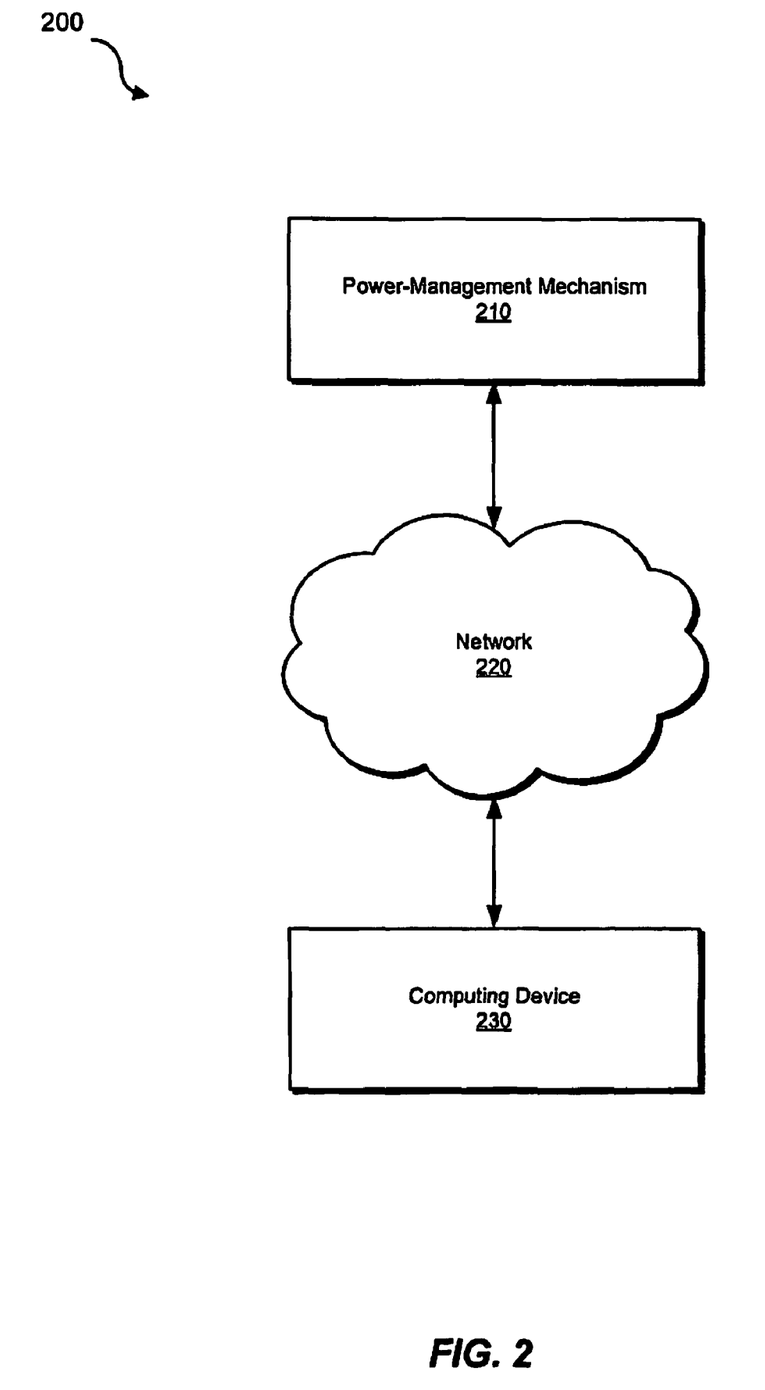
FIG. 2 is a block diagram of an exemplary system for managing power usage of a computing device based on power-management information from a power grid according to an additional embodiment.

The following will provide, with reference to FIGS. 1 and 2, detailed descriptions of exemplary systems for managing power usage of computing devices based on power-management information from a power grid. A detailed description of a corresponding exemplary computer-implemented method will also be provided in connection with FIG. 3. In addition, descriptions of an exemplary computing system and exemplary network architecture capable of implementing one or more of the embodiments described and/or illustrated herein will also be provided in connection with FIGS. 4 and 5.

FIG. 1 is a block diagram of an exemplary system 100 for managing power usage of computing devices based on power-management information from a power grid. As illustrated in this figure, exemplary system 100 may comprise one or more modules 102 for performing one or more tasks. For example, exemplary system 100 in FIG. 1 may comprise a power-publishing module 106 for publishing power-management information for a power grid and a requirements-assessor module 108 for identifying power-usage requirements of a computing device. Exemplary system 100 may also comprise a power-management module 110 for receiving power-management information and determining whether to adjust power usage of the computing device.

In certain embodiments, one or more of modules 102 in FIG. 1 may represent one or more software applications or programs that, when executed by a computing device, may cause the computing device to perform one or more tasks required to manage power usage based on power-management information from a power grid. For example, as will be described in greater detail below, one or more of modules 102 may represent software modules configured to run on one or more computing devices, such as the devices of system 200 in FIG. 2 (e.g., publishing mechanism 210 and computing device 230), computing system 400 in FIG. 4, and/or portions of exemplary network architecture 500 in FIG. 5. One or more of modules 102 in FIG. 1 may also represent all or portions of one or more special-purpose computers configured to perform one or more tasks required to manage power usage of computing devices based on power-management information from a power grid.

FIG. 2 is a block diagram of an exemplary system 200 for managing power usage of computing devices based on power-management information from a power grid. As illustrated in FIG. 2, exemplary system 200 may comprise at least one power-management mechanism 210, at least one computing device 230, and at least one network 220. The term "power-management mechanism," as used herein, generally refers to any mechanism, device, or plurality of devices capable of publishing power-management information to at least one additional device. Examples of power-management mechanism 210 include, without limitation, computers, servers, power utilities, embedded systems, or any other suitable computing device. In certain embodiments, one or more of modules 102 in FIG. 1 may be stored and configured to run on power-management mechanism 210.

Computing device 230 generally represents any electrical device capable of computing (i.e., comprising a central processing unit). Examples of computing device 230 include, without limitation, computers (e.g., laptops or desktops), cellular phones, personal digital assistants (PDAs), digital cameras, multimedia players, embedded systems, combinations of one or more of the same, or any other suitable computing device. In certain embodiments, one or more modules 102 may be stored and configured to run on computing device 230 to manage power usage based on power-management information from a power grid. Furthermore, one or more of modules 102 may be shared between power-management mechanism 210 and computing device 230, meaning that the same module may be configured to operate simultaneously on separate devices for a single purpose.

Network 220 generally represents any medium capable of facilitating communication or data transfer. Examples of network 220 include—without limitation—an intranet, a wide area network (WAN), a local area network (LAN), a personal area network (PAN), the Internet, power line communications (PLC), a cellular network (e.g., GSM network), or the like. Network 220 may facilitate communication or data transfer via wireless or wired connections. In addition to facilitating communication between computing device 230 and power-management mechanism 210, network 220 may also facilitate peer-to-peer communication between computing device 230 and additional computing devices.

Figure 3:
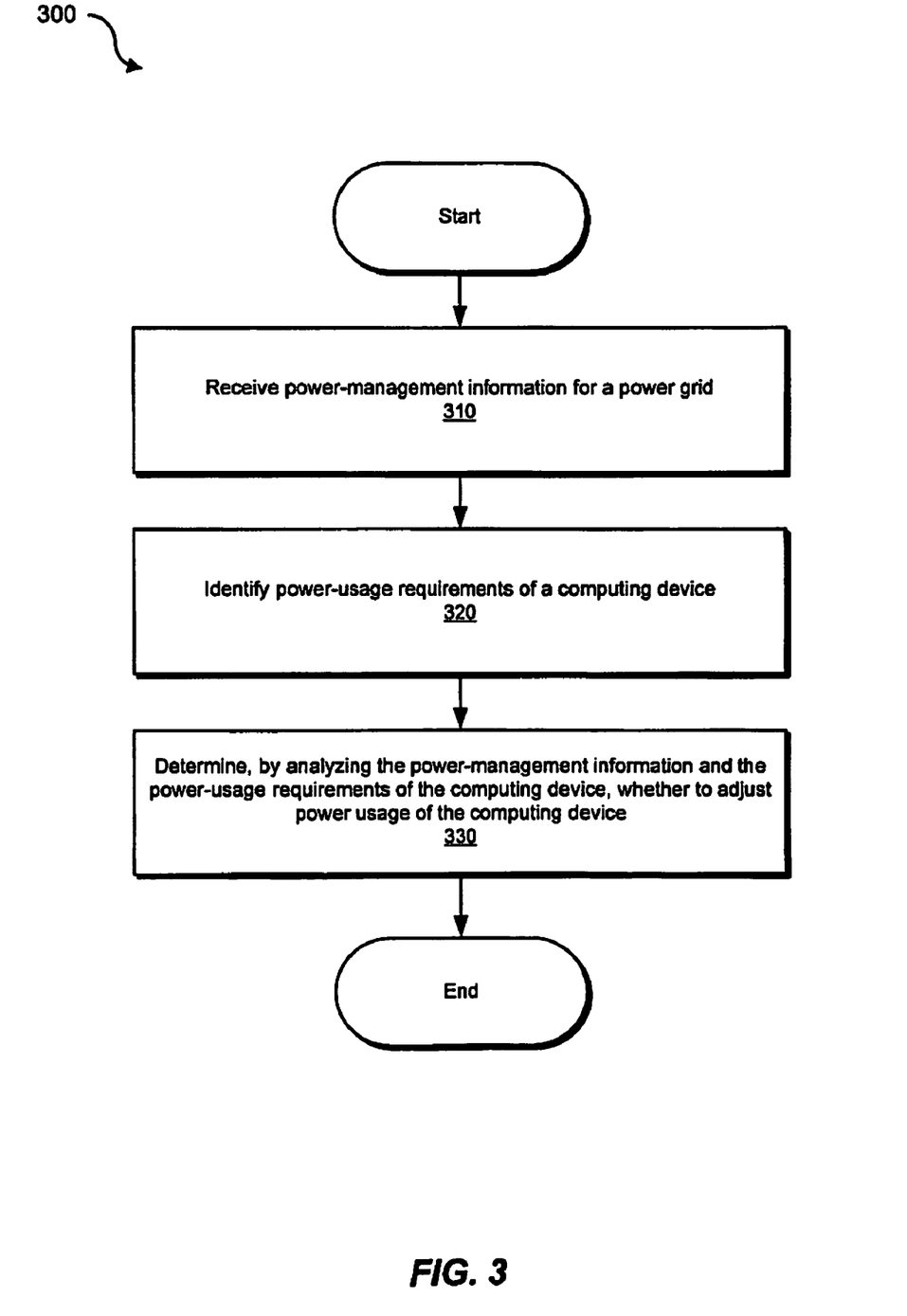
FIG. 3 is a flow diagram of an exemplary computer-implemented method for managing power usage of a computing device based on power-management information from a power grid according to at least one embodiment.

FIG. 3 is a flow diagram of an exemplary computer-implemented method 300 for managing power usage of computing devices based on power-management information from a power grid. As illustrated in this figure, at step 310 the system may receive power-management information from a power grid. For example, power-management module 110 in FIG. 1, which may be stored and configured to run on computing device 230 in FIG. 2, may receive power-management information from power-publishing module 106 in FIG. 1, which may be stored and configured to run on power-management mechanism 210 in FIG. 2.

The phrase "power-management information," as used herein, generally refers to any type or form of information from a power grid that may be used to manage power usage of a computing device. Examples of power-management information include, without limitation, information that indicates preferred power-usage levels for a computing device or information that identifies, or that may be used to calculate, an amount of power available on the power grid. Power-management information may be represented in either computer-readable or human-readable format.

In additional embodiments, the power-management information may comprise power-capacity information for the power grid and/or power-usage information for the power grid. The power-capacity information may indicate the maximum amount of power that the power grid is capable of sourcing—more specifically, the maximum amount of power that a power source within the power grid is capable of sourcing. In contrast, the power-usage information may indicate the collective amount of power used or consumed by electrical devices on the power grid (i.e., devices powered by the power grid). Such electrical devices may also comprise non-computing devices (i.e., devices without a CPU), such as blow dryers or light bulbs. In this embodiment, power-management module 110 may calculate an amount of power currently available on the power grid by subtracting the total power usage on the power grid from the total power capacity of the power grid.

As detailed above, the power-management information may identify the amount of power currently available on the power grid or the amount of power expected to be available on the power grid at a future time. The system may forecast or project future power availability in several ways. For example, power-management mechanism 210 may forecast future power availability using statistical data analysis based on previous data (e.g., data trends). In certain embodiments, power-management mechanism 210 may gather information needed to forecast power availability for the power grid by interacting with requirements-assessor module 108 on a number of computing devices within the grid.

In several embodiments, the power-management information received in step 310 may contain a time limit for expiration of the power-management information. In this embodiment, the time-limit information may indicate a time when the power-management information may expire or a length of time that the power-management information may remain active.

At step 320, the system may identify power-usage requirements of the computing device. For example, requirements-assessor module 108 in FIG. 1, which may be stored and configured to run on computing device 230, may identify the power-usage requirements of computing device 230. As used herein, the phrase "power-usage requirements" may refer to the amount of power required by a computing device in order to maintain its current or scheduled level of computing activity.

Requirements-assessor module 108 may identify the power-usage requirements of computing device 230 in a variety of ways. For example, requirements-assessor module 108 may identify: 1) each process currently running or scheduled to run on computing device 230 and/or 2) the power usage of at least one component of computing device 230. The term "process," as used herein, generally refers to any computer-implemented task, program, or instruction that a computing device may execute. Examples of processes include, without implementation, malware scans, video games, video-editing processes, word-processing applications, printing jobs, web-browsing applications, media-player applications, software or operating-system updates, instant-messaging applications, or any other suitable process. In addition, the term "component" may refer to any physical component of a computing device, including, without limitation, central processing units (CPUs), memory devices (e.g., hard drives, RAM, and ROM), input and output devices (e.g., mice, audio speakers, and monitors), and communication devices (e.g., wireless cards and network cards), or any other component.

By identifying each process currently running or scheduled to run on computing device 230 and/or the power usage of one or more components of computing device 230, requirements-assessor module 108 may be able to determine whether computing device 230 is idle, engaged in light computing tasks (e.g., browsing the web), or engaged in heavy computing tasks (e.g., video editing or gaming). Requirements-assessor module 108 may then be able to determine the amount of power required by computing device 230 in order for it to continue to execute each current or scheduled process.

At step 330, the system may determine whether to adjust the power usage of the computing device by analyzing both the power-management information received in step 310 and the power-usage requirements identified in step 320. For example, if power-management module 110 in FIG. 1, which may be stored and configured to run on computing device 230 in FIG. 2, determines that the power-management information received in step 310 identifies a need for reduced power usage by computing device 230, then power-management module 110 may determine whether the amount of power used by computing device 230 may be reduced without negatively impacting the current or scheduled level of computing activity of computing device 230. In other words, power-management module 110 may attempt to balance the needs of the power grid (as identified in the power-management information received in step 310) with the power-usage requirements of computing device 230 identified in step 320.

Power-management module 110 may determine that the power-management information received in step 310 identifies a need for reduced power usage by computing device 230 in a variety of ways. For example, in embodiments where the power-management information received in step 310 contains preferred power-usage levels for computing device 230 (as explained above), power-management module 110 may determine whether the current power usage of computing device 230 is greater than the preferred power-usage level identified in the power-management information.

Additionally, in embodiments where the power-management information received in step 310 merely identifies (or contains information that may be used to calculate) an amount of power currently available or projected to be available on the power grid, power-management module 110 may determine whether the amount of power currently available or projected to be available on the power grid is low or in great demand. For example, if power-management module 110 determines that the power-management information received in step 310 indicates that the amount of power available on the power grid is extremely low or that demand is extremely high, then power-management module 110 may determine that the power usage of computing device 230 should be reduced as much as possible without negatively impacting the current or scheduled level of computing activity of computing device 230.

If power-management module 110 determines that the power-management information received in step 310 identifies a need for reduced power usage by computing device 230, then power-management module 110 may determine whether the amount of power used by computing device 230 may be reduced without negatively impacting the current or scheduled level of computing activity of computing device 230. For example, if requirements-assessor module 108 determines that computing device 230 is idle or merely engaged in light computing tasks (such as browsing the web), then power-management module 110 may determine that the power usage of computing device 230 may be lowered without negatively impacting the current or scheduled level of computing activity of computing device 230. Alternatively, if requirements-assessor module 108 determines that computing device 230 is engaged in heaving computing tasks (such as video editing or gaming), then power-management module 110 may determine that any reduction in the power usage of computing device 230 will negatively impacting the current or scheduled level of computing activity of computing device 230.

If power-management module 110 determines that the amount of power used by computing device 230 may be reduced without negatively impacting the current or scheduled level of computing activity of computing device 230, then power-management module 110 may reduce the power usage of computing device 230. Power-management module 110 may adjust the power usage of computing device 230 in a variety of ways. In one embodiment, power-management module 110 may adjust the power usage of computing device 230 by adjusting at least one power setting on computing device 230. For example, power-management module 110 may cause computing device to enter a power-saving mode, a sleep mode, a standby mode, a hibernation mode, or some other mode that may reduce the power usage of computing device 230.

In certain embodiments, power-management module 110 may adjust a power setting on computing device 230 by adjusting the power usage of at least one component of computing device 230. For example, power-management module

110 may stop or slow (i.e. reduce the RPMs of) one or more hard drives of computing device 230, alter the speed of fans within computing device 230, dim the brightness of one or more displays attached to computing device 230, cause one or more CPUs of computing device 230 to enter an under-voltage mode, cause one or more graphics processing units (GPUs) of computing device 230 to enter an under-voltage mode, cause USB devices attached to computing device 230 to enter a standby mode or low-power mode, or the like.

In an additional example, power-management module 110 may adjust the power usage of computing device 230 by terminating at least one process running on computing device 230. For example, power-management module 110 may terminate a defragmentation operation or an antivirus scan running on computing device 230 to reduce power usage. Power-management module 110 may terminate processes temporarily or permanently. In other words, power-management module 110 may pause a process for a period of time.

As detailed above, the power-management information received in step 310 may identify an amount of power expected to be available on the power gird at a future time. In this embodiment, power-management module 110 may consider, when determining whether to adjust a power setting or a process, the amount of power expected to be available at a future time. For example, if the power-availability information indicates that the amount of power expected to be available at a future time is lower than the amount of power currently available, power-management module 110 may allow a process currently running on computing device 230 to continue execute until the identified time, rather than immediately terminating or pausing the process.

Power-management module 110 may also consider additional factors in determining whether to adjust the power usage of computing device 230. For example, power-management module 110 may consider the priority level associated with a process running on computing device 230 when determining whether to terminate the process. Power-management module 110 may also consider any additional number of other characteristics or factors when determining whether to adjust the power usage of computing device 230.

In certain embodiments, power-management module 110 may identify a base state of power usage for computing device 230 prior to adjusting the power usage of computing device 230. The phrase "base state," as used herein, generally refers to the power settings or processes running on computing device 230 prior to adjusting the power usage of computing device 230. In one example, the base state of power usage may comprise a default state of power settings for computing device 230.

As detailed above, in certain embodiments the power-management information received in step 310 may contain a time limit for expiration of the power-management information. In this embodiment, when the time limit for the power-management information expires, the system may restore the power usage of the computing device back to its base state. For example, when the time limit for the power-information received in step 310 expires, power-management module 110 may restore the previous power settings of computing device 230.

In one embodiment, the system may issue a discount on power costs to a computing device for complying with the power-management information received in step 310. For example, in embodiments where the power-management information contains a preferred power-usage level for computing device 230, the power grid may grant a discount on power costs to computing device 230 for reducing its power usage to the preferred power-usage level. In certain embodiments, the power grid may automatically grant the discount after verifying that computing device 230 adjusted power usage in accordance with the power-management information.

As explained above, the systems and methods disclosed herein may allow computing devices to adjust power usage based on power-management information from a power grid. These systems and methods may enable a power grid to reduce the number of power outages, both intentional (e.g., rolling blackouts) and unintentional, resulting from insufficient infrastructure or resources.

Figure 4:
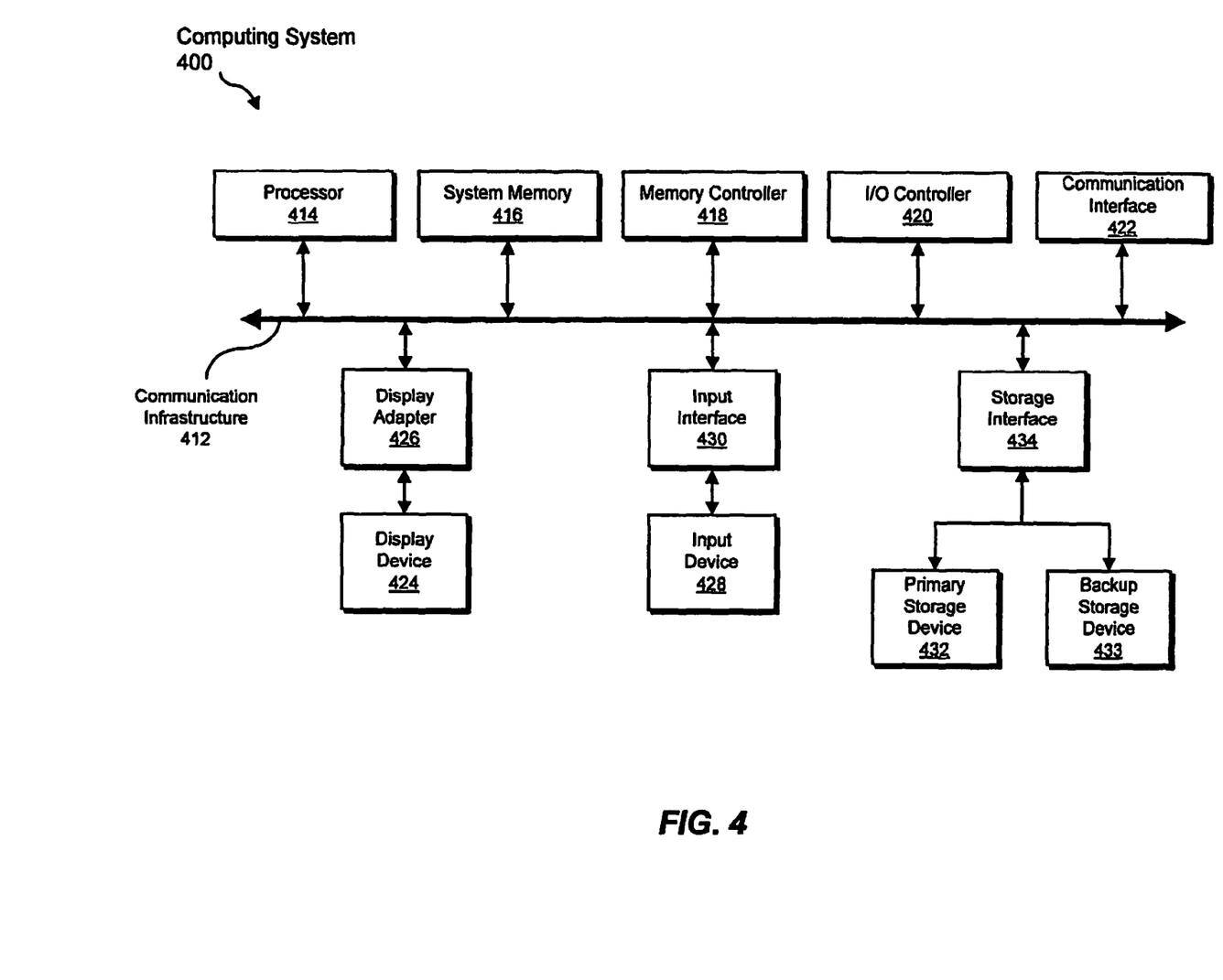
FIG. 4 is a block diagram of an exemplary computing system capable of implementing one or more of the embodiments described and/or illustrated herein.

FIG. 4 is a block diagram of an exemplary computing system 410 capable of implementing one or more of the embodiments described and/or illustrated herein. Computing system 410 broadly represents any single or multi-processor computing device or system capable of executing computer-readable instructions. Examples of computing system 410 include, without limitation, workstations, laptops, client-side terminals, servers, distributed computing systems, handheld devices, or any other computing system or device. In its most basic configuration, computing system 410 may comprise at least one processor 414 and a system memory 416.

Processor 414 generally represents any type or form of processing unit capable of processing data or interpreting and executing instructions. In certain embodiments, processor 414 may receive instructions from a software application or module. These instructions may cause processor 414 to perform the functions of one or more of the exemplary embodiments described and/or illustrated herein. For example, processor 414 may perform and/or be a means for performing, either alone or in combination with other elements, one or more of the receiving, identifying, determining, analyzing, calculating, adjusting, and restoring steps described herein. Processor 414 may also perform and/or be a means for performing any other steps, methods, or processes described and/or illustrated herein.

System memory 416 generally represents any type or form of volatile or non-volatile storage device or medium capable of storing data and/or other computer-readable instructions. Examples of system memory 416 include, without limitation, random access memory (RAM), read only memory (ROM), flash memory, or any other suitable memory device. Although not required, in certain embodiments computing system 410 may comprise both a volatile memory unit (such as, for example, system memory 416) and a non-volatile storage device (such as, for example, primary storage device 432, as described in detail below).

In certain embodiments, exemplary computing system 410 may also comprise one or more components or elements in addition to processor 414 and system memory 416. For example, as illustrated in FIG. 4, computing system 410 may comprise a memory controller 418, an Input/Output (I/O) controller 420, and a communication interface 422, each of which may be interconnected via a communication infrastructure 412. Communication infrastructure 412 generally represents any type or form of infrastructure capable of facilitating communication between one or more components of a computing device. Examples of communication infrastructure 412 include, without limitation, a communication bus (such as an ISA, PCI, PCIe, or similar bus) and a network.

Memory controller 418 generally represents any type or form of device capable of handling memory or data or controlling communication between one or more components of computing system 410. For example, in certain embodiments memory controller 418 may control communication between processor 414, system memory 416, and I/O controller 420 via communication infrastructure 412. In certain embodiments, memory controller may perform and/or be a means for performing, either alone or in combination with other elements, one or more of the steps or features described and/or illustrated herein, such as receiving, identifying, determining, analyzing, calculating, adjusting, and/or restoring.

I/O controller 420 generally represents any type or form of module capable of coordinating and/or controlling the input and output functions of a computing device. For example, in certain embodiments I/O controller may control or facilitate transfer of data between one or more elements of computing system 410, such as processor 414, system memory 416, communication interface 422, display adapter 426, input interface 430, and storage interface 434. I/O controller 420 may be used, for example, to perform and/or be a means for performing, either alone or in combination with other elements, one or more of the receiving, identifying, determining, analyzing, calculating, adjusting, and restoring steps described herein. I/O controller 420 may also be used to perform and/or be a means for performing other steps and features set forth in the instant disclosure.

Communication interface 422 broadly represents any type or form of communication device or adapter capable of facilitating communication between exemplary computing system 410 and one or more additional devices. For example, in certain embodiments communication interface 422 may facilitate communication between computing system 410 and a private or public network comprising additional computing systems. Examples of communication interface 422 include, without limitation, a wired network interface (such as a network interface card), a wireless network interface (such as a wireless network interface card), a modem, and any other suitable interface. In at least one embodiment, communication interface 422 may provide a direct connection to a remote server via a direct link to a network, such as the Internet. Communication interface 422 may also indirectly provide such a connection through, for example, a local area network (such as an Ethernet network), a personal area network, a telephone or cable network, a cellular telephone connection, a satellite data connection, or any other suitable connection.

In certain embodiments, communication interface 422 may also represent a host adapter configured to facilitate communication between computing system 410 and one or more additional network or storage devices via an external bus or communications channel. Examples of host adapters include, without limitation, SCSI host adapters, USB host adapters, IEEE 494 host adapters, SATA and eSATA host adapters, ATA and PATA host adapters, Fibre Channel interface adapters, Ethernet adapters, or the like. Communication interface 422 may also allow computing system 410 to engage in distributed or remote computing. For example, communication interface 422 may receive instructions from a remote device or send instructions to a remote device for execution. In certain embodiments, communication interface 422 may perform and/or be a means for performing, either alone or in combination with other elements, one or more of the receiving, identifying, determining, analyzing, calculating, adjusting, and restoring steps disclosed herein. Communication interface 422 may also be used to perform and/or be a means for performing other steps and features set forth in the instant disclosure.

As illustrated in FIG. 4, computing system 410 may also comprise at least one display device 424 coupled to communication infrastructure 412 via a display adapter 426. Display device 424 generally represents any type or form of device capable of visually displaying information forwarded by display adapter 426. Similarly, display adapter 426 generally represents any type or form of device configured to forward graphics, text, and other data from communication infrastructure 412 (or from a frame buffer, as known in the art) for display on display device 424.

As illustrated in FIG. 4, exemplary computing system 410 may also comprise at least one input device 428 coupled to communication infrastructure 412 via an input interface 430. Input device 428 generally represents any type or form of input device capable of providing input, either computer or human generated, to exemplary computing system 410. Examples of input device 428 include, without limitation, a keyboard, a pointing device, a speech recognition device, or any other input device. In at least one embodiment, input device 428 may perform and/or be a means for performing, either alone or in combination with other elements, one or more of the receiving, identifying, determining, analyzing, calculating, adjusting, and restoring steps disclosed herein. Input device 428 may also be used to perform and/or be a means for performing other steps and features set forth in the instant disclosure.

As illustrated in FIG. 4, exemplary computing system 410 may also comprise a primary storage device 432 and a backup storage device 433 coupled to communication infrastructure 412 via a storage interface 434. Storage devices 432 and 433 generally represent any type or form of storage device or medium capable of storing data and/or other computer-readable instructions. For example, storage devices 432 and 433 may be a magnetic disk drive (e.g., a so-called hard drive), a floppy disk drive, a magnetic tape drive, an optical disk drive, a flash drive, or the like. Storage interface 434 generally represents any type or form of interface or device for transferring data between storage devices 432 and 433 and other components of computing system 410.

In certain embodiments, storage devices 432 and 433 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 432 and 433 may also comprise other similar structures or devices for allowing computer software, data, or other computer-readable instructions to be loaded into computing system 410. For example, storage devices 432 and 433 may be configured to read and write software, data, or other computer-readable information. Storage devices 432 and 433 may also be a part of computing system 410 or may be a separate device accessed through other interface systems.

In certain embodiments, the exemplary file systems disclosed herein may be stored on primary storage device 432, while the exemplary file-system backups disclosed herein may be stored on backup storage device 433. Storage devices 432 and 433 may also be used, for example, to perform and/or be a means for performing, either alone or in combination with other elements, one or more of the receiving, identifying, determining, analyzing, calculating, adjusting, and restoring steps disclosed herein. Storage devices 432 and 433 may also be used to perform and/or be a means for performing other steps and features set forth in the instant disclosure.

Many other devices or subsystems may be connected to computing system 410. Conversely, all of the components and devices illustrated in FIG. 4 need not be present to practice the embodiments described and/or illustrated herein. The devices and subsystems referenced above may also be interconnected in different ways from that shown in FIG. 4. Computing system 410 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 410. All or a portion of the computer program stored on the computer-readable medium may then be stored in system memory 416 and/or various portions of storage devices 432 and 433. When executed by processor 414, a computer program loaded into computing system 410 may cause processor 414 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 410 may be configured as an application specific integrated circuit (ASIC) adapted to implement one or more of the exemplary embodiments disclosed herein.

Figure 5:
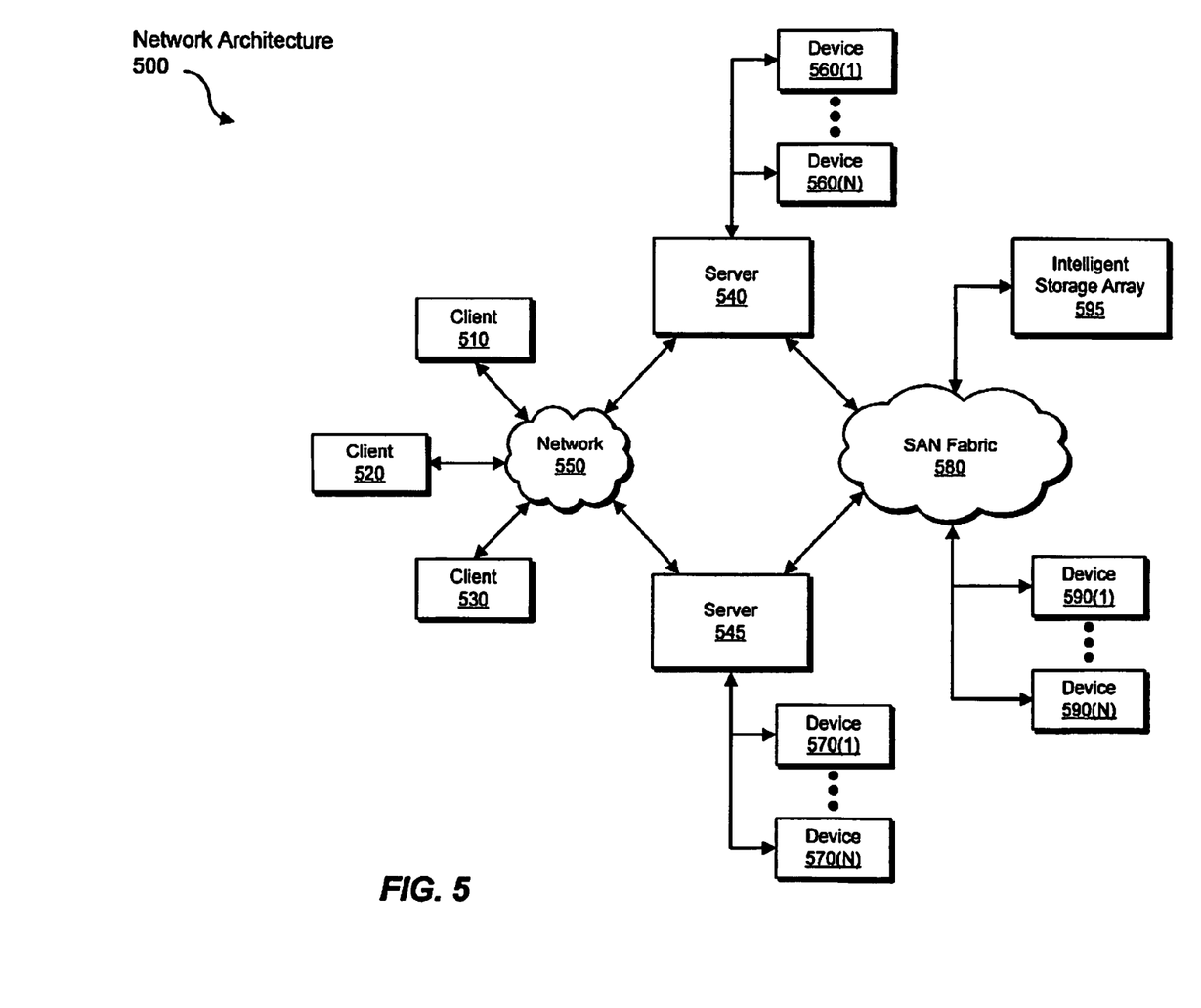
FIG. 5 is a block diagram of an exemplary computing network capable of implementing one or more of the embodiments described and/or illustrated herein.

FIG. 5 is a block diagram of an exemplary network architecture 500 in which client systems 510, 520, and 530 and servers 540 and 545 may be coupled to a network 550. Client systems 510, 520, and 530 generally represent any type or form of computing device or system, such as exemplary computing system 410 in FIG. 4. Similarly, servers 540 and 545 generally represent computing devices or systems, such as application servers or database servers, configured to provide various database services and/or to run certain software applications. Network 550 generally represents any telecommunication or computer network; including, for example, an intranet, a wide area network (WAN), a local area network (LAN), a personal area network (PAN), the Internet, a cellular network (e.g., GSM network), or any other network.

As illustrated in FIG. 5, one or more storage devices 560(1)-(N) may be directly attached to server 540. Similarly, one or more storage devices 570(1)-(N) may be directly attached to server 545. Storage devices 560(1)-(N) and storage devices 570(1)-(N) generally represent any type or form of storage device or medium capable of storing data and/or other computer-readable instructions. In certain embodiments, storage devices 560(1)-(N) and storage devices 570(1)-(N) may represent network-attached storage (NAS) devices configured to communicate with servers 540 and 545 using various protocols, such as NFS, SMB, or CIFS.

Servers 540 and 545 may also be connected to a storage area network (SAN) fabric 580. SAN fabric 580 generally represents any type or form of computer network or architecture capable of facilitating communication between a plurality of storage devices. SAN fabric 580 may facilitate communication between servers 540 and 545 and a plurality of storage devices 590(1)-(N) and/or an intelligent storage array 595. SAN fabric 580 may also facilitate, via network 550 and servers 540 and 545, communication between client systems 510, 520, and 530 and storage devices 590(1)-(N) and/or intelligent storage array 595 in such a manner that devices 590(1)-(N) and array 595 appear as locally attached devices to client systems 510, 520, and 530. As with storage devices 560(1)-(N) and storage devices 570(1)-(N), storage devices 590(1)-(N) and intelligent storage array 595 generally represent any type or form of storage device or medium capable of storing data and/or other computer-readable instructions.

In certain embodiments, and with reference to exemplary computing system 410 of FIG. 4, a communication interface, such as communication interface 422 in FIG. 4, may be used to provide connectivity between each client system 510, 520, and 530 and network 550. Client systems 510, 520, and 530 may be able to access information on server 540 or 545 using, for example, a web browser or other client software. Such software may allow client systems 510, 520, and 530 to access data hosted by server 540, server 545, storage devices 560(1)-(N), storage devices 570(1)-(N), storage devices 590(1)-(N), or intelligent storage array 595. Although FIG. 5 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 540, server 545, storage devices 560(1)-(N), storage devices 570(1)-(N), storage devices 590(1)-(N), intelligent storage array 595, or any combination thereof. All or a portion of one or more of the exemplary embodiments disclosed herein may also be encoded as a computer program, stored in server 540, run by server 545, and distributed to client systems 510, 520, and 530 over network 550. Accordingly, network architecture 500 may perform and/or be a means for performing, either alone or in combination with other elements, one or more of the receiving, identifying, determining, analyzing, calculating, adjusting, and restoring steps disclosed herein. Network architecture 500 may also be used to perform and/or be a means for performing other steps and features set forth in the instant disclosure.

As detailed above, computing system 410 and/or one or more of the components of network architecture 500 may perform and/or be a means for performing, either alone or in combination with other elements, one or more steps of the exemplary methods described and/or illustrated herein. For example, a computer-implemented method for managing power usage of a computing device based on power-management information from a power grid may comprise: 1) receiving power-management information from a power grid, 2) identifying power-usage requirements of the computing device, and then 3) determining, by analyzing the power-management information and the power-usage requirements of the computing device, whether to adjust power usage of the computing device.

In at least one embodiment, the power-management information may comprise a power-management request that indicates preferred power-usage levels for the computing device. To identify the power-usage requirements, the method may also comprise identifying at least one process currently running or scheduled to run on the computing device. In addition, the method may identify the power usage of at least one component of the computing device. The method may further comprise determining whether to adjust at least one power setting on the computing device or whether to terminate at least one process running on the computing device. In one embodiment, the power setting may comprise a power state of the computing device.

Furthermore, the power-management information may comprise power-availability information. The power-availability information may identify an amount of power currently available on the power grid or an amount of power expected to be available on the power grid at a future time. In one embodiment, the power-availability information may comprise power-capacity information and power-usage information that may be used to calculate the amount of power available on the power grid.

In addition, the method may further comprise identifying a time limit for expiration of the power-management information. The time limit may be contained within the power-management information or received separately from the power grid. In at least one embodiment, the method may further comprise identifying a base state of power usage for the computing device, adjusting the power usage of the computing device, and then restoring the power usage of the computing device to the base state when the time limit for the power-management information expires. The method may also comprise receiving a discount on power used by the computing device.

A computer-readable medium comprising one or more computer-executable instructions is also disclosed. In one example, the computer-readable medium, when executed by a computing device, may cause the computing device to: 1) receive power-management information, 2) identify power-usage requirements of the computing device, and then 3) determine, by analyzing the power-management information and the power-usage requirements of the computing device, whether to adjust power usage of the computing device.

In some embodiments, the computer-readable medium may further cause the computing device to identify at least one process currently running, at least one process scheduled to run, and/or the power usage of at least one component of the computing device. The computer-readable medium may also cause the computing device to determine whether to adjust at least one power setting or determine whether to terminate at least one process running on the computing device. In addition, the computer-readable medium may cause the computing device to identify a time limit for expiration of the power-management information. The computer-readable medium may also cause the computing device to identify a base state of power usage, adjust the power usage, and restore the power usage of the computing device to the base state when the time limit for the power-management information expires.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for managing power usage of a computing device based on power-management information received from a power grid, the method comprising:
   receiving, at the computing device, power-management information from the power grid that identifies a need for reduced power usage by the computing device;
   identifying, at the computing device, power-usage requirements of the computing device by:
      identifying at least one process currently being executed or scheduled to be executed by a processor of the computing device;
      identifying an amount of power required by the computing device to execute the process that is currently being executed or scheduled to be executed by the processor of the computing device;
   determining, at the computing device by analyzing both the power-management information received from the power grid and the power-usage requirements of the computing device, that the power usage of the computing device may be reduced without negatively impacting the process that is currently being executed or scheduled to be executed by the processor of the computing device;
   reducing the power usage of the computing device in response to determining that the power usage of the computing device may be reduced without negatively impacting the process that is currently being executed or scheduled to be executed by the processor of the computing device.

2. The method of claim 1, wherein the power-management information comprises a power-management request containing preferred power-usage levels for the computing device.

3. The method of claim 1, wherein identifying the power-usage requirements of the computing device further comprises at least one of:
   identifying at least one additional process that is currently being executed or scheduled to be executed by the processor of the computing device;
   identifying power usage of at least one component of the computing device.

4. The method of claim 1, wherein reducing the power usage of the computing device comprises at least one of:
adjusting at least one power setting on the computing device;
reducing power usage of at least one component on the computing device.

5. The method of claim 1, wherein reducing the power usage of the computing device comprises terminating at least one additional process currently being executed or scheduled to be executed by the processor of the computing device.

6. The method of claim 5, further comprising, prior to terminating the additional process that is currently being executed or scheduled to be executed by the processor of the computing device:
identifying a priority level associated with the additional process;
determining, based at least in part on the priority level associated with the additional process, to terminate the additional process.

7. The method of claim 5, wherein terminating the additional process that is currently being executed or scheduled to be executed by the processor of the computing device comprises at least one of:
temporarily terminating the additional process;
permanently terminating the additional process.

8. The method of claim 1, wherein the power-management information comprises power-availability information for the power grid.

9. The method of claim 8, wherein the power-availability information identifies at least one of:
an amount of power currently available on the power grid;
an amount of power expected to be available on the power grid at a future time.

10. The method of claim 8, wherein the power-availability information comprises:
power-capacity information for the power grid;
power-usage information for the power grid.

11. The method of claim 10, further comprising calculating, based on the power-capacity information and the power-usage information, an amount of power available on the power grid.

12. The method of claim 1, further comprising identifying a time limit for expiration of the power-management information.

13. The method of claim 12, wherein identifying the time limit for expiration of the power-management information comprises at least one of:
identifying the time limit within the power-management information;
receiving, after receiving the power-management information, time-limit information that identifies the time limit.

14. The method of claim 12, further comprising:
identifying a base state of power usage for the computing device;
restoring the power usage of the computing device to the base state when the time limit for the power-management information expires.

15. The method of claim 1, further comprising receiving a discount on power used by the computing device for reducing the power usage of the computing device.

16. A system for managing power usage based on power-management information received from a power grid, the system comprising:
a requirements-assessor module installed on a computing device and programmed to identify power-usage requirements of the computing device by:
identifying at least one process currently being executed or scheduled to be executed by a processor of the computing device;
identifying an amount of power required by the computing device to execute the process that is currently being executed or scheduled to be executed by the processor of the computing device;
a power-management module installed on the computing device and programmed to:
receive power-management information from the power grid that identifies a need for reduced power usage by the computing device;
determine, by analyzing both the power-management information received from the power grid and the power-usage requirements of the computing device, that the power usage of the computing device may be reduced without negatively impacting the process that is currently being executed or scheduled to be executed by the processor of the computing device;
reduce the power usage of the computing device in response to determining that the power usage of the computing device may be reduced without negatively impacting the process that is currently being executed or scheduled to be executed by the processor of the computing device;
at least one processor configured to execute the requirements-assessor module and the power-management module.

17. The system of claim 16, wherein the power-management module reduces the power usage of the computing device by at least one of:
adjusting at least one power setting on the computing device;
reducing power usage of at least one component on the computing device;
terminating at least one additional process that is currently being executed or scheduled to be executed by the processor of the computing device.

18. A non-transitory computer-readable storage medium comprising one or more computer-executable instructions that, when executed by a computing device, cause the computing device to:
receive, at the computing device, power-management information from a power grid that identifies a need for reduced power usage by the computing device;
identify, at the computing device, power-usage requirements of the computing device by:
identifying at least one process currently being executed or scheduled to be executed by a processor of the computing device;
identifying an amount of power required by the computing device to execute the process that is currently being executed or scheduled to be executed by the processor of the computing device;
determine, at the computing device by analyzing both the power-management information received from the power grid and the power-usage requirements of the computing device, that the power usage of the computing device may be reduced without negatively impacting the process that is currently being executed or scheduled to be executed by the processor of the computing device;
reduce the power usage of the computing device in response to determining that the power usage of the computing device may be reduced without negatively impacting the process that is currently being executed or scheduled to be executed by the processor of the computing device.

19. The non-transitory computer-readable storage medium of claim 18, wherein the one or more computer-executable instructions, when executed by the computing device, further cause the computing device to identify the power-usage requirements of the computing device by at least one of:
- identifying at least one additional process that is currently being executed or scheduled to be executed by the processor of the computing device;
- identifying power usage of at least one component of the computing device.

20. The non-transitory computer-readable storage medium of claim 18, wherein the one or more computer-executable instructions, when executed by the computing device, cause the computing device to reduce the power usage of the computing device by at least one of:
- adjusting at least one power setting on the computing device;
- reducing power usage of at least one component of the computing device;
- terminating at least one additional process that is currently being executed or scheduled to be executed by the processor of the computing device.

* * * * *